United States Patent Office 3,787,377
Patented Jan. 22, 1974

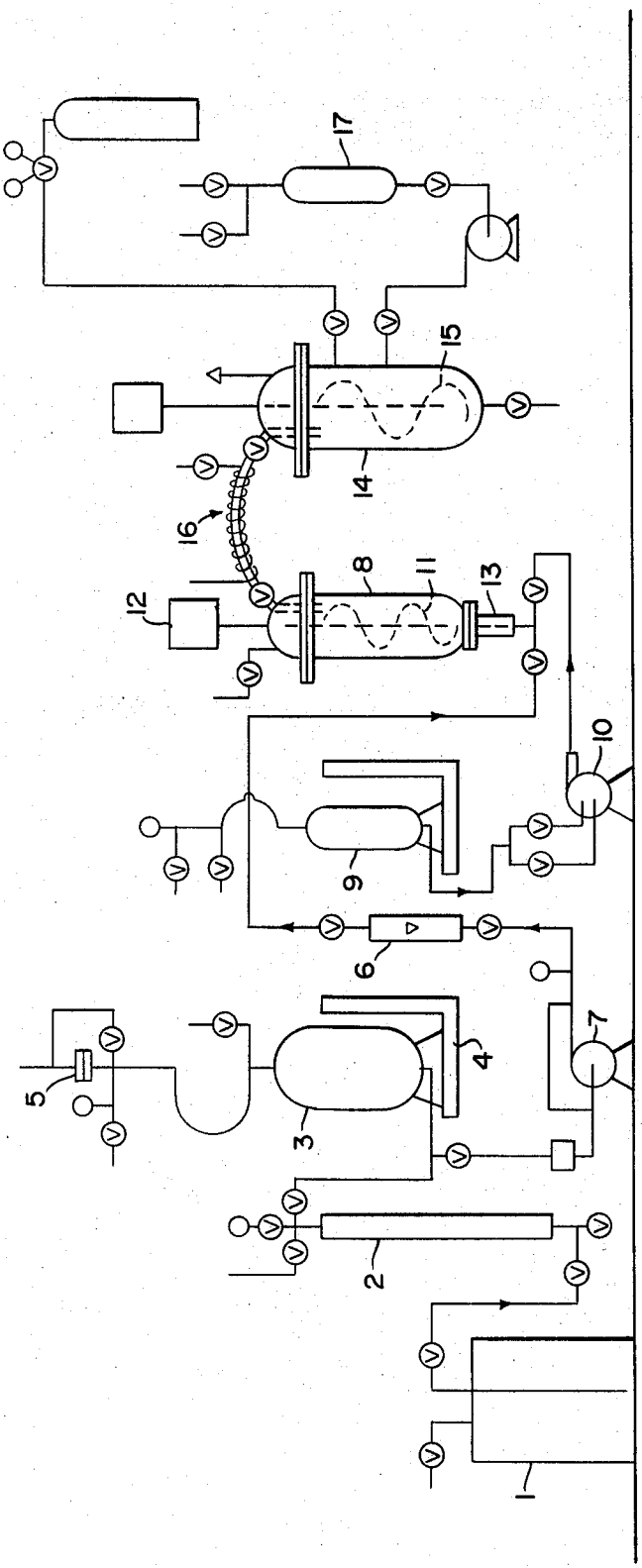

3,787,377
CONTINUOUS PROCESS OF COPOLYMERIZING BUTADIENE AND STYRENE
Adel F. Halasa, Bath, and Arthur E. Oberster, North Canton, Ohio, assignors to The Firestone Tire & Rubber Company, Akron, Ohio
Filed Dec. 16, 1971, Ser. No. 208,876
Int. Cl. C08f 19/08
U.S. Cl. 260—83.7    3 Claims

ABSTRACT OF THE DISCLOSURE

Butadiene and styrene was copolymerized in a solution which is kept intact as it is passed through reactor means in a continuous process, using butyllithium as the initiator, with sodium or potassium t-amylate or mentholate as a modifier to produce a constant-composition copolymer rubber. A gel suppressant is used in the polymerization. The microstructure of the polybutadiene in the copolymer is not greatly different from that of the copolymer produced by butyllithium alone.

---

Constant-composition rubber copolymers of butadiene and styrene are produced in a continuous process using a butyllithium initiator and a modifier such as sodium or potassium t-amylate or mentholate. At the temperatures used commercially, a gel suppressant is necessary. The microstructure of the polybutadiene in the copolymer produced is not greatly different from that obtained with butyllithium alone. Diglyme (diethylene glycol dimethyl ether) is advantageously used as a gel suppressant, but there are other suppressants known to the art such as tetrahydrofuran, triglyme, tetraglyme, etc. which may be used.

A constant-composition copolymer, i.e. a copolymer in which the monomer units enter the polymer in the same proportion as the charge ratio, contains very little block polymer, usually not substantially greater than one-half of one percent.

The copolymers produced by the process have good flow resistance at room temperature and have good processing properties.

The use of potassium and sodium alkoxide and other modifiers as randomizing agents is known. See, for example, Wofford 3,294,768 and 3,496,154. In the latter patent, the examples refer to batch operations, utilizing potassium t-butoxide with butyllithium in polymerizations which utilize cyclohexane as the solvent. The patent does not recognize potassium t-amylate (KOt-amyl) as an exceptional modifier. Actually, it is one of the few modifiers soluble in aliphatic solvents customarily used in producing rubbers by polymerization initiated by butyllithium. In a batch operation, it is not necessary that the modifier be soluble in the solvent employed. However, in a continuous process in which the solution of the polymerization reaction mixture is kept intact in passing through the reactor means, it is necessary to use a soluble modifier. So far as known, sodium and potassium t-amylate and metholate are the only modifiers for such polymerizations which are soluble in the solvents usually employed, namely, aliphatic paraffinic and cyclic hydrocarbons containing 4 to 12 carbon atoms. In addition, they do not significantly change the microstructure of the polybutadiene portions cf the polymer produced. It is generally known that ethers and amines behave as randomizing agents; however, they significantly increase the vinyl content of the polybutadiene produced.

Sodium and potassium t-amylate and mentholate are valuable as modifiers not only because of their solubility which permits easy metering which makes careful control of the polymerization possible, but they are effective at elevated temperatures and yield good processable polymers. In addition, they have little or no affect on the microstructure of the polybutadiene produced. Usually 0.01 to 0.5 millimole of the modifier, and preferably 0.01 to 0.2 millimole per 100 grams of total monomer charged will be used. The effect of the modifier on the microstructure at the level utilized is minimal. The amylates are preferred because of their availability, and they have less effect on the microstructure of the polymers than the mentholates.

A usual amount of butyllithium initiator, e.g. 0.1 to 1.0 millimole per 100 grams of total monomer, will be used.

An advantage in the use of a sodium or potassium t-amylate or mentholate as the modifier is that the process can be carried out at an elevated temperature, and thus the capacity of the reactor system is increased. Temperatures above room temperature are desirable for maximum production rates, but at the elevated temperatures, gel formation is increased and it is desirable to use a gel suppressant. Thus with sodium or potassium t-amylate, a temperature of at least about 60° or 95° C., respectively, will be used, and for sodium or potassium mentholate, a temperature of at least about 100° or 115° C., respectively, will be used. The polymerization may be carried out at temperatures as high as 150° C. or higher. A preferred range is 110° to 125° C.

In carrying out the continuous process, usually a blend of the butadiene solution containing the styrene together with the modifier is introduced continuously into the reactor. Simultaneously, the butyllithium is introduced through the same port. Usually, the reactants are introduced into the bottom of the reactor, and the solution of the polymer is removed continuously from the top of the reactor. The residence time of the reactants in the reactor will depend upon the temperature employed, etc.

The amount of butadiene and styrene employed in the preparation of the constant-composition copolymer can vary over a wide range, e.g. from 50 to 95 parts by weight of butadiene and from 50 to 5 parts by weight of styrene.

In the continuous copolymerization of butadiene and styrene, there is a tendency to form gel in the polymers particularly when the reaction is carried out at elevated temperatures (60–125° C.). This gel formation is not only detrimental to the properties of the resulting polymer but the gelled polymer is insoluble in the reaction solvent and tends to deposit in the reactor and build up there, resulting in plugging up the reactor. The continuous polymerization process is thus interrupted because the reactor must be disassembled for clean-up, causing costly delays in production. It is known in the art that materials can be added to suppress this tendency to gel formation. Materials known to suppress gel formation include 1,2-diolefin compounds such as propadiene and 1,2-butadiene. However, these materials cannot be used in the presence of butyllithium with the modifiers listed above (K or Na t-amylate or mentholate) because of rapid termination of the polymerization due to the reaction of the alkyllithium or polymer lithium to form a lithium acetylide. We have discovered, however, that an effective gel suppressant that can be used in this system is diglyme (diethylene glycol dimethyl ether). The amount required will depend upon the reactants employed and the temperature at which the polymerization is carried out. Usually, between 100 and 2000 parts by weight, and preferably 150 to 300 parts per million parts of the monomer is used.

The process may be carried out in any reactor means in which the polymerization solution, after formation, is carried through the reactor means continuously without subtraction of solution therefrom or addition thereto of monomer, catalyst, modifier, etc., and it is therefore described herein as being passed through the reactor means intact. The reactor means may include one or more reactors. If a simple reactor is used, it is not necessary that all of the reaction ingredients be mixed before addition to the reactor because they all may be added to one region of the reactor with removal of the polymer solution from another region.

The invention is further described in connection with the accompanying flow sheet which is purely illustrative and capable of wide variations and modifications. The butadiene, styrene and usually also the modifier and gel suppressant are dissolved in the solvent to form a blend stored in tank 1. The use of a soluble modifier thus simplifies the procedure. The modifier may be added separately, in solution. As usual, the blend is first passed through desiccant tower 2 (which may comprise molecular sieves) and then to blend weigh tank 3 positioned on scales 4. The tank is advantageously equipped with safety means such as the rupture disc 5. The amount of blend in tank 3 is kept constant. From here, the blend is passed through flowmeter 6 by pump 7 to reactor 8. Catalyst is supplied from weigh tank 9 by pump 10. The agitator 11 is driven by a variable speed motor 12. Usually the blend solution, containing modifier and gel suppressant enters the reactor 8 through a cooling chamber 13 to prevent premature polymerization—where it is pre-mixed with the initiator. The blend solution and initiator thus enter the reactor at the desired temperature at the same time. If there are a plurality of reactors, there will usually be temperature control means associated with each reactor or with the conduits connecting the reactors.

The solution containing the desired polymer passes from the top of reactor 8 into the receiver 14 which is advantageously equipped with an agitator 15, and the transfer line is jacketed at 16 to heat the polymer cement in order to maintain a low viscosity for ease of transfer. The antioxidant from storage tank 17 is added to the polymer cement in receiver 14 and the cement is then cooled by cooling the receiver. The whole operation is carried out under an inert atmosphere by introducing nitrogen or other inert gas into the various pieces of equipment and collecting it for storage by any suitable means, not shown.

The Mooney and other properties of the copolymer can be controlled by known means.

The following Table I includes the results of several continuous polymerizations. In these polymerizations, the modifier and gel suppressant when used were added to the monomer blend. The residence time in the reactor was ninety minutes, i.e., the time required for a complete turnover of material in the reactor.

TABLE I

| Run number | A | B | C | D | E | F |
|---|---|---|---|---|---|---|
| Monomer charge: | | | | | | |
| Butadiene | 80 | 80 | 80 | 80 | 82 | 82 |
| Styrene | 20 | 20 | 20 | 20 | 18 | 18 |
| Hexane | 300 | 300 | 300 | 300 | 300 | 300 |
| Initiator charge: n-Butyllithium, mmole | 0.6 | 0.6 | 0.6 | 0.6 | 0.6 | 0.6 |
| Modifier charge: | | | | | | |
| KOt-amylate, mmole | 0 | 0.3 | 0.12 | 0.06 | 0.06 | 0.06 |
| KOt-amylate/nBuLi | | 0.5 | 0.2 | 0.1 | 0.1 | 0.1 |
| Gel suppressant: | | | | | | |
| Parts per million monomer: | | | | | | |
| 1,2-butadiene | 0 | 0 | 250 | 500 | 0 | 0 |
| Diglyme | 0 | 0 | 0 | 0 | 140 | 300 |
| Reaction temperature: | | | | | | |
| °F | 245 | 245 | 240 | 240 | 240 | 240 |
| °C | 118 | 118 | 116 | 116 | 116 | 116 |
| Results | (a) | (b) | (c) | (d) | (e) | (f) |

COMMENT ON RESULTS OF RUNS A TO F (a) After four hours of continuous operation the polymer contained gel and contained about 10 percent block styrene. This is the usual case with no modifier present.

(b) After two hours continuous operation, the polymer contained no block styrene and no gel. After four hours continuous operation, the polymer contained 4 percent gel and no block styrene and after eight hours operation, the polymer contained 40 percent gel and no block styrene. Here we see the effect of the KOt-amylate in giving a constant-composition copolymer. However, gelation is a problem.

(c) This run utilizes 250 p.p.m. 1,2-butadiene but gelation still is a problem in that onset of gelation again occurred after four hours.

(d) This run utilized 500 p.p.m. 1,2-butadiene but the reaction died off very rapidly. Investigation revealed that the 1,2-butadiene is rapidly isomerized to 1-butyne which then rapidly reacts with n-butyllithium or polymer lithium to give a lithium acetylide which is inactive as an initiator and the reaction terminates.

(e) This run utilized 140 p.p.m. diglyme as a gel suppressant and after four hours of continuous operation, the resulting polymer contained no block styrene and no gel. However, shortly thereafter, some gel was apparent in the reactor.

(f) This run utilized 300 p.p.m. diglyme as a gel suppressant and after eight hours of continuous operation the polymer contained no block styrene and no gel. Also, there was no gel in the reactor.

These results show the effect of the modifier at low levels in producing a constant-composition copolymer containing no gel on a continuous copolymerization.

Table II includes polymer properties on several of the above runs as compared with a commercial constant-composition butadiene/styrene copolymer.

TABLE II

| | Polymer run number | | | Commercial polymer |
|---|---|---|---|---|
| | C | E | F | |
| DSV | 2.41 | 2.96 | 2.69 | 2.95 |
| Gel, percent | 0 | 0 | 0 | 0 |
| I.R. analysis, percent: | | | | |
| Cis-1,4 | 30.5 | 26.0 | 25.1 | 31.2 |
| Trans-1,4 | 56.3 | 55.7 | 52.3 | 58.4 |
| Trans-1,2 | 13.2 | 18.3 | 22.6 | 10.4 |
| Styrene | 22.4 | 23.4 | 22.8 | 22.5 |
| Chemical block | 0 | 0 | 0 | 0 |

We note that the polymers contain no block styrene and that the microstructure is not drastically changed. The above polymers were compounded in a tread stock recipe and the properties were identical to that of the commercial control.

We claim:

1. In the process of copolymerizing 50 to 95 parts by weight of butadiene and 50 to 5 parts by weight of styrene with 0.1 to 1.0 millimole of butyllithium per 100 parts of monomer, in solution in an aliphatic paraffinic or cyclic hydrocarbon of 4 to 12 carbon atoms at a temperature of 100 to 150° C., the improvement in which in continuous polymerization the solution passes through reactor means intact, using 100 to 2000 parts by weight of diglyme per 100 million parts of monomer as a gel suppressant, and using as a modifier of the butyllithium 0.01 to 0.5 millimole per 100 grams of total monomer, the modifier being selected from the class consisting of sodium t-amylate, potassium t-amylate, sodium mentholate and potassium mentholate.

2. The process of claim 1 in which the modifier is 0.01 to 0.2 millimole of potassium t-amylate based on 100 grams of total polymer.

3. The process of claim 1 in which the initiator is n-butyllithium, the modifier is 0.01 to 0.2 millimole of potassium or sodium t-amylate based on 100 grams of the total polymers, and the temperature is 110° to 125° C.

References Cited
UNITED STATES PATENTS

| | | | |
|---|---|---|---|
| 3,198,774 | 8/1965 | Huxtable | 260—83.7 |
| 3,294,768 | 12/1966 | Wofford | 260—83.7 |
| 3,496,154 | 2/1970 | Wofford | 260—83.7 |
| 3,554,997 | 1/1971 | Bates | 260—83.7 |
| 3,558,575 | 1/1971 | Keckler | 260—83.7 |

JAMES A. SEIDLECK, Primary Examiner

U.S. Cl. X.R.

260—94.2 T

UNITED STATES PATENT OFFICE
CERTIFICATE OF CORRECTION

Patent No. 3,787,377　　　　Dated January 22, 1974

Inventor(s) Adel F. Halasa and Arthur E. Oberster

It is certified that error appears in the above-identified patent and that said Letters Patent are hereby corrected as shown below:

Column 1, Line 13, "was" should be --are--.

Column 1, Line 60, "metholate" should be --mentholate--.

Signed and sealed this 21st day of May 1974.

(SEAL)
Attest:

EDWARD M. FLETCHER, JR.
Attesting Officer

C. MARSHALL DANN
Commissioner of Patents